Figure 1:
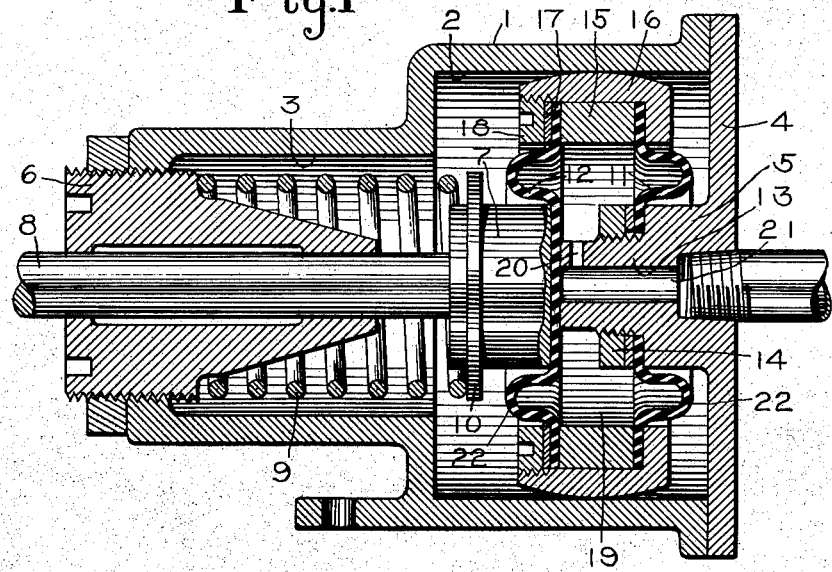

May 22, 1945.  R. J. BUSH  2,376,475
FLUID PRESSURE MOTOR
Filed Sept. 29, 1942

INVENTOR
Rankin J. Bush
BY
ATTORNEY

Patented May 22, 1945

2,376,475

UNITED STATES PATENT OFFICE 2,376,475

FLUID PRESSURE MOTOR

Rankin J. Bush, Jeannette, Pa., assignor to The Westinghouse Air Brake Company, Wilmerding, Pa., a corporation of Pennsylvania Application September 29, 1942, Serial No. 460,050

3 Claims. (Cl. 137—156.5)

This invention relates to fluid pressure motors and more particularly to a flexible diaphragm structure for use therein.

Flexible disk like diaphragms made from rubber like composition and having molded therein suitable reenforcing fabric have been developed to withstand high fluid pressures such as encountered in certain air brake devices. Unlike ringed pistons however, the movement or deflection of such diaphragms must be limited in order to avoid overstressing of the diaphragms and consequent premature failure thereof. Where it is desired to move a device a distance exceeding the deflection of an operating diaphragm it has therefore been necessary to resort to a lever or the like to amplify the diaphragm movement and due to use of the lever a larger diaphragm has been required to provide a certain delivered force at the device than if the diaphragm would have been connected directly to the device.

The principal object of the invention is the provision of an improved diaphragm structure of the above type for connection directly with a device to be actuated and so constructed as to provide any desired movement of said device without overstressing the diaphragm structure.

According to this object, I provide a structure including a pile of diaphragms of the above described type, the sum of the deflections of which equals the desired movement of the device to be operated. I connect these diaphragms to each other in series with the central portion of the diaphragms at one end of the pile fixed against movement and the corresponding portion of the diaphragm at the opposite end bearing against the piston head to be operated. In case the pile comprises only two diaphragms the outer peripheries thereof are connected to provide an air tight seal therebetween. In case the pile comprises more than two diaphragms the outer peripheries of each adjacent pair of diaphragms are thus connected together while the inner peripheries of each adjacent pair, not including the end diaphragms, are also connected to provide an air tight seal between them. The space within the diaphragms is arranged to receive fluid under pressure to extend the structure in a direction away from the end diaphragm having the fixed central portion and to apply actuating force through the other end diaphragm to the connected piston head. With this structure the piston head may be moved a distance equal to the sum of the permissible deflections of all of the diaphragms.

I am aware that various metal diaphragm structures, such as of the corrugated type, have been developed wherein overstressing of the individual corrugations may be avoided by providing an adequate number of corrugations to obtain a desired movement. I am also aware that corrugated tubing or bellows made of rubber composition and fabric is old. So far as I am aware however a rubber fabric diaphragm structure, of what may be called the corrugated type, which will withstand high fluid pressures has never been produced due I understand to it being impossible to provide in such a structure the required fabric reenforcement.

This difficulty is avoided however according to the invention since the improved diaphragm structure is built up from a multiple of individual disc like diaphragms of a type known to withstand high pressures.

Other objects and advantages will appear from the following more detailed description of the invention.

Figure 2:
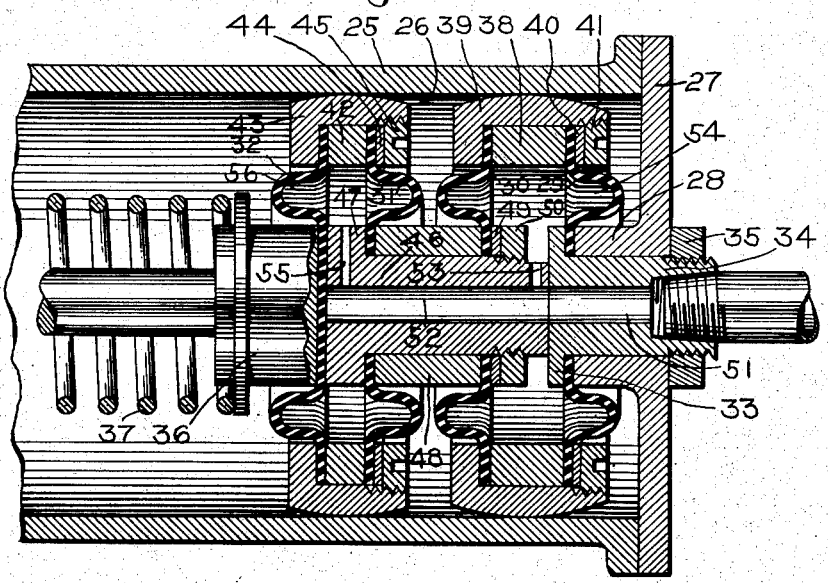

In the accompanying drawing; Fig. 1 is a cross-sectional view of a fluid motor embodying a diaphragm structure constructed in accordance with the invention; and Fig. 2 is a view similar to Fig. 1 but of another embodiment of the invention.

Description Figure 1

The fluid motor shown in Fig. 1 comprises a casing 1 having two axially aligned bores 2 and 3 of different diameters connected at their adjacent ends and open at their opposite or outer ends. The outer end of bore 2 is closed by a cover 4 having an annular boss 5 extending inwardly from its inner face. In the outer end of bore 3 is disposed an adjusting nut 6 having an adjustable screw-threaded connection with the casing.

A piston head 7 disposed in the bore 2 is supported on the end of a piston rod 8 which is slidably mounted and supported in a suitable axial bore provided through the nut 6. The outer end of the rod 8 is adapted to be connected to any device (not shown) which it is desired to operate. A coil spring 9 encircling the piston rod 8 within bore 3 bears at one end against the nut 6 and at the opposite end against an annular collar 10 provided around the piston head 7.

According to the invention I provide an improved diaphragm structure for applying force to the piston head 7 for moving said head and the rod 8 in a direction against spring 9 to actuate the device connected to the rod.

In the embodiment shown in Fig. 1 this improved diaphragm structure comprises two individual disc like flexible diaphragms 11 and 12 of smaller diameter than bore 2 and disposed therein. Both of these diaphragms are constructed of any suitable material such as rubber composition having embedded therein suitably disposed fabric or the like to support the diaphragm against relative high fluid pressures acting on one face.

The diaphragm 11 has a central opening through which extends a projection 13 of boss 5, said projection being of smaller diameter than said boss to provide an annular shoulder on the end of said boss for engagement by one side of the portion of diaphragm 11 immediately adjacent and surrounding the periphery of said opening. This central portion of diaphragm 11 is clamped into leak tight contact with the end of boss 5 by a nut 14 having screw-threaded contact with the projection 13.

The central portion of the diaphragm 12 is disposed in operative engagement with the piston head 9. This diaphragm may be identical to the diaphragm 11 if desired and hence be secured to the piston head 7 in any conventional manner, but I prefer that the central portion of diaphragm 12 be imperforate as shown in order to minimize the possibility of leakage of fluid under pressure from one side of the diaphragm to the opposite side. The projection 13 may be of such length as to engage the diaphragm 12 for limiting movement of the piston head under the action of spring 9.

The outer peripheral edges of the two diaphragms are connected together to prevent leakage of fluid under pressure therebetween. The connecting structure may comprise a rigid ring 15 of the same outside diameter as the two diaphragms interposed between and engaging the adjacent sides of the two diaphragms near their outer edges. A second rigid ring 16 encircling the ring 15 and the two diaphragms has at one end an inwardly extending annular collar engaging the outer face of diaphragm 11 over a portion opposite that engaged by ring 15. The corresponding portion of the outer face of diaphragm 12 is engaged by a ring 17 against which bears a nut 18 having a screw-threaded connection with ring 16 interiorly thereof. The nut 18 is screwed against the ring 17 with such force as to obtain leak tight connections with the opposite sides of the two diaphragms.

The two diaphragms and ring 15 cooperate to form between the diaphragms a pressure chamber 19 which is open through a radial port 20 in projection 13 to an axial bore 21 extending through the boss 5 to the exterior of cover 4. The outer end of this bore may be screw-threaded as shown in the drawing to receive one end of a control pipe through which fluid under pressure may be supplied to and released from pressure chamber 19.

In use, with pressure chamber 19 at atmospheric pressure the spring 9 may be so adjusted by nut 6 as to exert a force on piston head 7 to urge said head and thereby the diaphragm structure to the position shown and defined by contact between diaphragm 12 and the end of the extension 13 of boss 5.

If fluid under pressure is now supplied through bore 21 to chamber 9 it acts on the diaphragm 12 to apply force to the piston head 7 in opposition to that of spring 9 and when this force becomes sufficient to overcome said spring it will move the piston head 7 in the direction of bore 3. As the piston head thus moves, the consequent movement of the contacting portion of diaphragm 12 creates a stress in the portion between said head and the outer peripheral portion of said diaphragm which tends to move the diaphragm connecting rings 15 and 16 with the piston head, but such movement of said rings is opposed by the resistance to deformation of the portion of diaphragm 11 between said rings and boss 5. When however the stress in diaphragm 12 is increased to a degree exceeding the resistance to deformation of diaphragm 11, the diaphragm 12 will pull the rings 15 and 16 and the connected portion of diaphragm 11 in the direction of bore 3 and this will continue as long as the piston head 7 continues to move and thus maintains a stress in diaphragm 12 exceeding the resistance to deformation of diaphragm 11. Since the resistance to deformation in diaphragm 11 will increase substantially as the stress in diaphragm 12 increases upon movement of piston head 7 it will be seen that the two diaphragms will both deflect to substantially the same extent, as a result of which the rings 15 and 16 will move only substantially one half the movement of the piston head 7. Movement of the piston head 7 may be limited by engagement with the end of the adjusting nut 6 at which time further deflection of the two diaphragms will cease.

From the above description it will now be seen that both diaphragms bend or deflect upon movement of the piston head 7 and that the combined deflection of the two diaphragms therefore equals the stroke of said piston head. If the resistance to deformation of the two diaphragms are identical the deflection of each will equal one half the stroke of the piston head. In case the resistances of the two diaphragms to deflection are not identical one diaphragm may deflect to a slightly greater extent than the other, but even so the combined deflections will equal the stroke of the piston head. Thus if the stroke of the piston head 7 is twice the permissible deflection of either one of the two diaphragms, the combined deflection of the two diaphragms will provide for full stroking of the piston head without overstressing either diaphragm.

If desired each of the diaphragms 11 and 12 may be of the well known high pressure type having an annular corrugation 22 connecting the central portion of the diaphragm to its outer portion and projecting beyond the low pressure side of the diaphragm in order to provide for greater deflection and less stressing of the structure than obtainable with the type not having such a corrugation. As applied to the structure shown in Fig. 1 the corrugations 22 of the two diaphragms project from the outer and opposite faces of the respective diaphragms since the adjacent faces are the high pressure faces arranged to be subjected in chamber 19 to pressure of fluid.

The outer surface of ring 16 is in the shape of the segment of a sphere formed at a radius only slightly less than that of bore 2 in the casing, so that the ring will slide in the casing and also engage the wall of said bore to support the weight of said ring and of ring 15 and nut 18. Possible sagging of the diaphragms, which might occur if the diaphragms carried the weight of these parts, is thus avoided to maintain the diaphragms operative at maximum efficiency.

As above described the ring 16 moves in bore 2 upon movement of the piston head 7. The spherical shape of the outer surface of ring 16 is provided to prevent said ring becoming bound in the bore in case it should become tilted during such movement.

Description Figure 2

If greater movement of a piston head is required than provided by the combined permissible deflections of two flexible diaphragms, as obtained in the structure shown in Fig. 1, the number of diaphragms employed may be increased, preferably in multiples of two, to a degree where their combined permissible deflections equals at least the required stroke of the piston head, as provided for in the structure shown in Fig. 2 which will now be described.

The structure shown in Fig. 2 comprises a casing 25 having a bore 26 closed at one end by a cover 27 having an inwardly extending boss 28. In this chamber are four flexible diaphragms 29, 30, 31 and 32 of the same structure as the diaphragms 11 and 12 above described. The diaphragms 29 and 30 constitute one pair and the corrugations 22 therein are oppositely arranged as in Fig. 1. The diaphragms 31 and 32 constitute a second pair and the corrugations 22 therein are also oppositely arranged.

The central portion of diaphragm 29 is clamped against the end of boss 28 in leak tight contact by a collar 33 provided on one end of a sleeve 34 which is mounted in a bore through said boss and on the outer end of which is screw-threaded a clamping nut 35. The central portion of diaphragm 32 at the opposite end of the diaphragm pile bears against one face of a piston head 36 which is subject on its opposite face to the pressure of a spring 37, said head and spring corresponding to the piston head 7 and spring 9 in the structure of Fig. 1.

The outer peripherial portions of diaphragms 29 and 30 are operatively connected together by rings 38, 39, and 40 and a nut 41 like the structure shown in Fig. 1, while corresponding rings 42, 43, and 44 and a nut 45 operatively connect the outer peripherial portions of diaphragms 31 and 32 together. The two clamping rings 39 and 43 are slidable in bore 26 and their outer surfaces are spherical in form to prevent the rings becoming bound in said bore in case the rings should rock in the bore.

A sleeve 46 extends through the central bores in the two intermediate diaphragms 30 and 31 and has at one end an annular collar 47 bearing against the high pressure side of the diaphragm 31. A sleeve 48 is slidably mounted on sleeve 46 between the two diaphragms 30 and 31 and bears against the adjacent and low pressure faces thereof. Mounted on the opposite end of sleeve 46 is a ring 49 engaging the high pressure face of diaphragm 30 and a nut 50 having screw-threaded contact with said sleeve and tightened against the ring 49 for thereby clamping the central portions of the two diaphragms between the opposite ends of sleeve 48 and the collar 47 and ring 49.

The sleeve 34 has an axial passage 51 open at its outer end to a screw-threaded bore 52 provided to receive one end of a control pipe. The opposite end of passage 51 is open to a passage 52 extending through the sleeve 46. Adjacent the sleeve 34 the sleeve 46 has a radial passage 53 connecting passage 52 to a pressure chamber 54 formed between the two diaphragms 29 and 30, while a radial passage 55 through the opposite end of sleeve 46 and the collar 47 connects passage 52 to a pressure chamber 56 formed between the two diaphragms.

The pressure of spring 37 on piston head 36 may be so adjusted that when both pressure chambers 54 and 56 are open to the atmosphere by way of passages 53 and 55, respectively, and thence through passages 52 and 51, the piston head 36 will urge the diaphragm 32 into contact with the adjacent end of sleeve 46 and the opposite end of said sleeve against the adjacent end of sleeve 34 which is fixed in the boss 28.

If fluid under pressure is supplied to passages 51 and 52 and thence through passages 53 and 55 to pressure chambers 54 and 56 respectively, such pressure acting in chamber 54 on diaphragm 30 will tend to move same away from diaphragm 29 which is fixed centrally to the casing, and this tendency is opposed and balanced by the pressure of fluid in chamber 56 acting on the diaphragm 31. The pressure in chamber 56 acts on the diaphragm 32 in opposition to the force of spring 37, and when such pressure becomes increased sufficiently to overcome said spring, the diaphragm 32 will be deflected thereby and urge the piston head 36 toward the left hand.

As the diaphragm 32 is thus deflected a stress will be created therein and when this stress slightly exceeds the resistance to deformation of diaphragm 31, the latter will deflect about its central portion in the same direction. The diaphragm 32 will as a result become stressed and when the degree of such stress transmitted through sleeves 46 and 48 to the central portion of diaphragm 30 exceeds the resistance to deformation thereof, the diaphragm 30 will yield at its central portion and create a stress therein which will finally cause deflection of the diaphragm 29 about its central portion which is clamped to the casing.

From the above it will be noted that each of the diaphragms 29 to 32 will yield or deflect upon movement of the piston head 36, and that the sum of the deflections of the several diaphragms will equal the extent of movement of the piston head. When the piston head is being moved under pressure of fluid in chamber 56, the deflection of the leading diaphragm may be greatest due to having to cause deflection of all of the other diaphragms, while the deflection of the other diaphragms will be less in the direction of diaphragm 29 the deflection of which may be the least. When the force of spring is increased to a degree which counterbalances the pressure of fluid in chamber 56 and the piston head 36 stops moving, the stress in the several diaphragms will equalize, and assuming the characteristics of the several diaphragms to be identical, the deflection of each will equal substantially one fourth of the distance moved by the piston head 36.

In case the resistances to deformation of the several diaphragms differ, then there will be slight variations in the deflection of the several diaphragms, as will be apparent. Regardless of this however, the sum of the deflections of the several diaphragms will equal the stroke of the piston head; and with the characteristics of the diaphragms used known, an adequate number may be employed to prevent overstressing any of the diaphragms.

Summary

From the above it will now be seen that I have provided a diaphragm structure which is practical for use with high-actuating pressures since it provides for desired movement of a device to be operated without overstressing the diaphragms. The diaphragms are of a high pressure type and are serially connected to obtain a movement of the device equal to the sum of the deflections of the several diaphragms. Any desired number of diaphragms may be employed as required to obtain a desired movement, and regardless of the number the deflection of each individual diaphragm will be substantially the same and will not exceed the permissible value to avoid overstressing.

Having now described my invention, what I claim as new and desire to secure by Letters Patent, is:

1. A fluid motor comprising a casing having a horizontally arranged bore, a horizontally movable piston head in said casing, a pile of individual axially aligned non-metallic disc like flexible diaphragms disposed in said bore in concentric relation therewith, each diaphragm comprising a central portion, a peripherial portion and an annular corrugation connecting said portions and providing for movement of said portions axially relative to each other, the central portion of the diaphragm at one end of said pile being connected to said piston head for moving same when subject on one face to pressure of fluid and the central portion of the diaphragm at the opposite end of said pile being supported by said casing, means including ring-like means connecting the peripherial portions of said diaphragms together to provide between the diaphragms space to receive fluid under pressure to act on said one diaphragm for moving said piston head, and means providing for supply of fluid under pressure to said space, the surface of said ring like means having sliding contact with the wall of said bore and being formed lengthwise of said bore on a radius equal substantially to the radius of said bore.

2. A fluid motor comprising a casing having a horizontally arranged bore, a horizontally movable piston head in said casing, a pile of individual axially aligned non-metallic disc like flexible diaphragms disposed in said bore in concentric relation therewith, each diaphragm comprising a central portion, a peripherial portion and an annular corrugation connecting said portions and providing for movement of said portions axially relative to each other, the central portion of the diaphragm at one end of said pile being connected to said piston head for moving same when subject on one face to pressure of fluid and the central portion of the diaphragm at the opposite end of said pile being supported by said casing, ring-like means securing the peripherial portion of the diaphragm engaging said piston head to the peripherial portion of the adjacent diaphragm and providing an air tight connection therebetween, other ring-like means connecting the peripherial portion of the diaphragm supported by said casing to the peripherial portion of the adjacent diaphragm and providing an air tight connection therebetween, still other means connecting the central portions of the two said adjacent diaphragms together and providing an air tight connection therebetween, the last named means and the two ring-like means cooperating with said diaphragms to provide a fluid receiving space extending between the two end diaphragms and in between each pair of diaphragms connected by the said ring-like means for receiving fluid under pressure to act on the diaphragm connected to said piston head for moving said piston head, means providing for supply of fluid under pressure to said space, both of the above mentioned ring-like means having an exterior surface in sliding contact with the wall of said bore and being formed axially of the ring on a radius equal substantially to the radius of said bore.

3. In combination, a casing having a horizontally arranged bore, two spaced apart axially aligned non-metallic diaphragms disposed in said bore in concentric relation therewith, each diaphragm comprising a central portion, a peripheral portion and an annular corrugation connecting said portions means securing the central portion of one of said diaphragms to said casing, an element to be moved by deflection of said diaphragms secured to the central portion of the other diaphragm, means including a ring-like member interposed between and securing the peripheral portions of the two diaphragms together, said means and diaphragms cooperating to form a pressure chamber between said diaphragms, and means connected to said chamber providing for supply of fluid under pressure to and release of fluid under pressure from said chamber for controlling deflection of said diaphragms the outer peripheral surface of said ring-like member having sliding contact with the wall of said bore and being formed lengthwise of said bore on a radius equal substantially to the radius of said bore.

RANKIN J. BUSH.